(12) United States Patent
Nakata

(10) Patent No.: US 12,015,523 B2
(45) Date of Patent: Jun. 18, 2024

(54) COMMUNICATION APPARATUS, DATA RECORDING METHOD, AND NON-TRANSITORY COMPUTER-READABLE MEDIUM

(71) Applicant: NEC Corporation, Tokyo (JP)

(72) Inventor: Atsushi Nakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/637,159

(22) PCT Filed: Jan. 22, 2021

(86) PCT No.: PCT/JP2021/002237
§ 371 (c)(1),
(2) Date: Aug. 16, 2022

(87) PCT Pub. No.: WO2021/181910
PCT Pub. Date: Sep. 16, 2021

(65) Prior Publication Data
US 2022/0417097 A1    Dec. 29, 2022

(30) Foreign Application Priority Data
Mar. 11, 2020 (JP) ................................. 2020-042467

(51) Int. Cl.
*G06F 15/173*   (2006.01)
*H04L 41/0866*  (2022.01)
(Continued)

(52) U.S. Cl.
CPC ........ *H04L 41/0866* (2013.01); *H04L 43/062* (2013.01); *H04L 67/2885* (2013.01); *H04W 24/06* (2013.01)

(58) Field of Classification Search
CPC ... H04L 41/0866; H04L 41/34; H04L 43/062; H04L 43/12; H04L 67/2885
(Continued)

(56) References Cited

U.S. PATENT DOCUMENTS 8,539,567 B1 * 9/2013 Logue ..................... H04L 63/08
                                                      709/227
10,498,758 B1 * 12/2019 Schwartz ................ H04L 43/12
(Continued)

FOREIGN PATENT DOCUMENTS

CN    109803453 A      5/2019
CN    114128224 A  *   3/2022
(Continued)

OTHER PUBLICATIONS

Extended European Search Report for EP Application No. 21768337.4 dated on Oct. 21, 2022.
(Continued)

*Primary Examiner* — Richard G Keehn

(57) ABSTRACT

There is provided a communication apparatus that enables acquisition of data to be sent after a Secure Shell (SSH) connection between a wireless unit and a baseband unit is established. A communication apparatus (10) according to the present disclosure includes a communication unit (11) that establishes a first Secure Shell (SSH) connection with a wireless apparatus (20) that performs wireless communication with a communication terminal (40), and establishes a second SSH connection with a control apparatus (30) that performs a baseband process related to a signal used in the wireless communication, and a data recording unit (12) that records data of a management plane received from the wireless apparatus (20) through the first SSH connection or the data of the management plane received from the control apparatus (30) through the second SSH connection.

7 Claims, 16 Drawing Sheets

(51) Int. Cl.
   *H04L 43/062* (2022.01)
   *H04L 67/2885* (2022.01)
   *H04W 24/06* (2009.01)

(58) Field of Classification Search
   CPC .. H04L 63/168; H04L 63/0428; H04W 24/06; H04W 88/085
   See application file for complete search history.

(56) References Cited

U.S. PATENT DOCUMENTS

| | | | |
|---|---|---|---|
| 2012/0173661 A1* | 7/2012 | Mahaffey | H04L 41/12 709/217 |
| 2013/0155856 A1* | 6/2013 | Zhang | H04L 47/27 370/235 |
| 2014/0050103 A1 | 2/2014 | Niu et al. | |
| 2015/0058916 A1* | 2/2015 | Rostami-Hesarsorkh | H04L 63/168 726/1 |
| 2018/0070246 A1 | 3/2018 | Jack et al. | |
| 2018/0191873 A1 | 7/2018 | Bao et al. | |
| 2019/0020501 A1* | 1/2019 | Yu | H04L 41/34 |
| 2019/0245740 A1* | 8/2019 | Kachhla | H04L 41/04 |
| 2019/0281483 A1* | 9/2019 | Chalmer | G08G 5/0013 |
| 2020/0092171 A1* | 3/2020 | Ramakrishnan | H04L 41/0809 |
| 2020/0113008 A1 | 4/2020 | Luo et al. | |
| 2020/0137549 A1* | 4/2020 | Barabell | H04W 88/085 |
| 2020/0186449 A1* | 6/2020 | Tofighbakhsh | H04L 43/04 |
| 2021/0006571 A1* | 1/2021 | Yi | H04L 63/102 |
| 2023/0096929 A1* | 3/2023 | Akre | E06B 9/24 700/90 |
| 2023/0137381 A1* | 5/2023 | Fan | G06V 40/161 382/181 |

FOREIGN PATENT DOCUMENTS

| | | | | |
|---|---|---|---|---|
| CN | 115668910 A | * | 1/2023 | ......... H04N 5/23206 |
| JP | 2012-064007 A | | 3/2012 | |
| WO | WO-2016154248 A1 | * | 9/2016 | ............... G02B 6/00 |
| WO | WO-2020056183 A1 | * | 3/2020 | ......... H04L 12/4641 |

OTHER PUBLICATIONS

ORAN-WG4.MP.0-v02.00.00, O-RAN Fronthaul Working Group 4: "Management Plane Specification", Jul. 3, 2019, pp. 1-149.
International Search Report for PCT Application No. PCT/JP2021/002237, mailed on Apr. 13, 2021.
O-RAN, "Fronthaul Working Group, Fronthaul Interoperability Test Specification (IOT)", ORAN-WG4.IOT.0-v01.00, 2019. pp. 1-70.
Umeshuanneal et al., "Standardization trends for open and intelligent radio access networks O-RAN Front Hall Specifications Overview", NTT Docomo Technical Journal, vol. 27, No. 1, Apr. 23, 2019, pp. 43-55.
CN Office Action for Chinese Patent Application No. 202180020566.9, mailed on Jan. 2, 2024 with English Translation.
ORAN-WG4.IOT.0-v01.00, O-RAN Fronthaul Working Group, Fronthaul Interoperability Test Specification (IOT), Jul. 3, 2019, pp. 1-70.

* cited by examiner

| | |
|---|---|
| iana-hardware | |
| iana-if-type | |
| ietf-inet-types | |
| ietf-hardware | A(Physical interface information about device) |
| ietf-interfaces | A(O-RU IP address information) |
| ietf-ip | |
| ietf-yang-types | |
| ietf-dhcpv6-types | A(DHCP information) |
| ietf-yang-library | |
| ietf-netconf-acm | |
| ietf-netconf-monitoring | |
| o-ran-ald-port | |
| o-ran-externalio | |
| o-ran-interfaces | A(O-RU: NETCONF server mac-address information) |
| o-ran-mplane-int | A(O-DU: NETCONF client address information) |
| o-ran-processing-element | A(O-RU mac-address, O-DU mac-address information) |
| o-ran-transceiver | |
| o-ran-dhcp | A(DHCP information) |
| o-ran-ald | |
| o-ran-ecpri-delay | |
| o-ran-file-management | A(file server addres information) |

| | |
|---|---|
| o-ran-lbm | |
| o-ran-operations | containing ecpriversion |
| o-ran-performance-management | A(file server addres information) |
| o-ran-software-management | A(file server addres information) |
| o-ran-troubleshoting | |
| o-ran-udp-echo | |
| o-ran-uplane-conf | -containing O-RU Capability containing configuration of eaxc-id |
| o-ran-trace | |
| o-ran-beamforming | -containing O-RU Capability(beam-id) |
| o-ran-delay-management | |
| o-ran-module-cap | -containing O-RU Capability |
| o-ran-laa | |
| o-ran-laa-operations | |
| o-ran-antenna-calibration | |
| o-ran-sync | |
| o-ran-compression-factors | -containing O-RU Capability |
| o-ran-fan | |
| o-ran-fm | |
| o-ran-hardware | A(physical Port information) |
| o-ran-supervision | |
| o-ran-usermgmt | |

Fig. 8

| Preamble (8 Bytes) | Destination MAC Address (6 Bytes) | Source MAC Address (6 Bytes) | VLAN Tag (4 Bytes) | Type/Length (Ethertype) (2 Bytes) | Payload (46...1500 Bytes) | FCS (4 Bytes) | IFG (12 Bytes) |

Fig. 12

| | 0 (msb) | 1 | 2 | 3 | 4 | 5 | 6 | 7 (lsb) | # of bytes | |
|---|---|---|---|---|---|---|---|---|---|---|
| Section Type : any | ecpriVersion | | | ecpriReserved | | | | ecpriConcatenation | 1 | Octet 1 |
| | ecpriMessage | | | | | | | | 1 | Octet 2 |
| | ecpriPayload | | | | | | | | 2 | Octet 3 |
| | ecpriRtcid / ecpriPcid | | | | | | | | 2 | Octet 5 |
| | ecpriSeqid | | | | | | | | 2 | Octet 7 |

Fig. 13

| | 0 (msb) | 1 | 2 | 3 | 4 | 5 | 6 | 7 (lsb) | # of bytes | |
|---|---|---|---|---|---|---|---|---|---|---|
| | Section Type 1: DL/UL control msgs | | | | | | | | | |
| | transport header, see section 3.1.3 | | | | | | | | 8 | Octet 1 |
| | dataDirection | payloadVersion | | | filterIndex | | | | 1 | Octet 9 |
| | frameId | | | | | | | | 1 | Octet 10 |
| | subframeId | | | | slotId | | | | 1 | Octet 11 |
| | slotId | | startSymbolId | | | | | | 1 | Octet 12 |
| | numberOfsections | | | | | | | | 1 | Octet 13 |
| | sectionType = 1 | | | | | | | | 1 | Octet 14 |
| | udCompHdr | | | | | | | | 1 | Octet 15 |
| | reserved | | | | | | | | 1 | Octet 16 |
| | sectionId | | | | | | | | 1 | Octet 17 |
| | sectionId | | | | rb | symInc | startPrbc | | 1 | Octet 18 |
| | startPrbc | | | | | | | | 1 | Octet 19 |
| | numPrbc | | | | | | | | 1 | Octet 20 |
| | reMask[11:4] | | | | | | | | 1 | Octet 21 |
| | reMask[3:0] | | | | numSymbol | | | | 1 | Octet 22 |
| ef = 1 | beamId[14:8] | | | | | | | | 1 | Octet 23 |
| | beamId[7:0] | | | | | | | | 1 | Octet 24 |
| | section extensions as indicated by "ef" | | | | | | | | var | Octet 25 |
| | ⋮ | | | | | | | | | |
| | sectionId | | | | | | | | 1 | Octet N |
| | sectionId | | | | rb | symInc | startPrbc | | 1 | N+1 |
| | startPrbc | | | | | | | | 1 | N+2 |
| | numPrbc | | | | | | | | 1 | N+3 |
| | reMask[11:4] | | | | | | | | 1 | N+4 |
| | reMask[3:0] | | | | numSymbol | | | | 1 | N+5 |
| ef = 0 | beamId[14:8] | | | | | | | | 1 | N+6 |
| | beamId[7:0] | | | | | | | | 1 | N+7 |
| | section extensions as indicated by "ef" | | | | | | | | var | N+8 |
| | | | | | | | | | | Octet M |

Fig. 14

| 0 (msb) | 1 | 2 | 3 | 4 | 5 | 6 | 7 (lsb) | # of bytes | |
|---|---|---|---|---|---|---|---|---|---|
| | Section Type 3 : PRACH & mixed-numerology | | | | | | | | |
| colspan="8" | transport header, see section 3.1.3 | | | | | | | 8 | Octet 1 |
| dataDirection | colspan="2" | payloadVersion | | colspan="4" | filterIndex | | | | 1 | Octet 9 |
| colspan="8" | frameId | | | | | | | 1 | Octet 10 |
| colspan="4" | subframeId | | | | colspan="4" | slotId | | | | 1 | Octet 11 |
| colspan="2" | slotId | | colspan="6" | startSymbolId | | | | | | | 1 | Octet 12 |
| colspan="8" | numberOfsections | | | | | | | 1 | Octet 13 |
| colspan="8" | sectionType = 3 | | | | | | | 1 | Octet 14 |
| colspan="8" | timeOffset | | | | | | | 2 | Octet 15 |
| colspan="8" | frameStructure | | | | | | | 1 | Octet 17 |
| colspan="8" | cpLength | | | | | | | 2 | Octet 18 |
| colspan="8" | udCompHdr | | | | | | | 1 | Octet 20 |
| colspan="8" | sectionId | | | | | | | 1 | Octet 21 |
| colspan="6" | sectionId | | | | | | rb | symInc | startPrbc | | 1 | Octet 22 |
| colspan="8" | startPrbc | | | | | | | 1 | Octet 23 |
| colspan="8" | numPrbc | | | | | | | 1 | Octet 24 |
| colspan="4" | reMask[11:4] | | | | colspan="4" | numSymbol | | | | 1 | Octet 25 |
| ef | colspan="3" | reMask[3:0] | | | | colspan="4" | beamId[14:8] | | | | 1 | Octet 26 |
| colspan="8" | beamId[7:0] | | | | | | | 1 | Octet 27 |
| colspan="8" | freqOffset | | | | | | | 3 | Octet 28 |
| colspan="8" | reserved (8 bits) | | | | | | | 1 | Octet 32 |
| colspan="8" | section extensions as indicated by "ef" | | | | | | | var | Octet 33 |
| | ... | | | | | | | | |
| colspan="8" | sectionId | | | | | | | 1 | Octet N |
| colspan="6" | sectionId | | | | | | rb | symInc | startPrbc | | 1 | N+1 |
| colspan="8" | startPrbc | | | | | | | 1 | N+2 |
| colspan="8" | numPrbc | | | | | | | 1 | N+3 |
| colspan="4" | reMask[11:4] | | | | colspan="4" | numSymbol | | | | 1 | N+4 |
| ef | colspan="3" | reMask[3:0] | | | | colspan="4" | beamId[14:8] | | | | 1 | N+5 |
| colspan="8" | beamId[7:0] | | | | | | | 1 | N+6 |
| colspan="8" | freqOffset | | | | | | | 3 | N+7 |
| colspan="8" | reserved (8 bits) | | | | | | | 1 | N+11 |
| colspan="8" | section extensions as indicated by "ef" | | | | | | | var | N+12 |
| | | | | | | | | | Octet M |

Fig. 15

| | 0 (msb) | 1 | 2 | 3 | 4 | 5 | 6 | 7 (lsb) | # of bytes | |
|---|---|---|---|---|---|---|---|---|---|---|
| | | | | Section Type 1,3 : DL/UL IQ data msgs | | | | | | |
| | | | | transport header, see section 3.1.3 | | | | | 8 | Octet 1 |
| dataDirection | | | payloadVersion | | | filterIndex | | | 1 | Octet 9 |
| frameId | | | | | | | | | 1 | Octet 10 |
| subframeId | | | | slotId | | | | | 1 | Octet 11 |
| slotId | | | symbolId | | | | | | 1 | Octet 12 |
| sectionId | | | | | | | | | 1 | Octet 13 |
| sectionId | | | | rb | symInc | startPrbu | | | 1 | Octet 14 |
| startPrbu | | | | | | | | | 1 | Octet 15 |
| numPrbu | | | | | | | | | 1 | Octet 16 |
| udCompHdr (not always present) | | | | | | | | | 1 | Octet 17 |
| reserved (not always present) | | | | | | | | | 1 | Octet 18 |
| udCompParam (not always present) | | | | | | | | | 1 | Octet 17/19 |
| iSample (1st RE in the PRB) | | | | | | | | | 1* | Octet 18/20 |
| qSample (1st RE in the PRB) | | | | | | | | | 1* | Octet 19/21* |
| ⋮ | | | | | | | | | | |
| iSample (12th RE in the PRB) | | | | | | | | | 1* | Octet 40/42* |
| qSample (12th RE in the PRB) | | | | | | | | | 1* | Octet 41/43* |
| udCompParam (not always present) | | | | | | | | | 1* | Octet 42/44* |
| iSample (1st RE in the PRB) | | | | | | | | | 1* | Octet 43/45* |
| qSample (1st RE in the PRB) | | | | | | | | | 1* | Octet 44/46* |
| ⋮ | | | | | | | | | | |
| iSample (12th RE in the PRB) | | | | | | | | | 1* | Octet 65/67* |
| qSample (12th RE in the PRB) | | | | | | | | | 1* | Octet 66/68* |

Fig. 16

COMMUNICATION APPARATUS, DATA RECORDING METHOD, AND NON-TRANSITORY COMPUTER-READABLE MEDIUM

This application is a National Stage Entry of PCT/JP2021/002237 filed on Jan. 22, 2021, which claims priority from Japanese Patent Application 2020-042467 filed on Mar. 11, 2020, the contents of all of which are incorporated herein by reference, in their entirety.

TECHNICAL FIELD

The present disclosure relates to a communication apparatus, a data recording method, and a program.

BACKGROUND ART

In recent years, wireless access networks in which a baseband unit and a wireless unit of a base station are separated and connected via fronthaul have been used. The Open-Radio Access Network (O-RAN) fronthaul specifications specified in the O-RAN alliance specify the fronthaul specifications between an Open Radio Unit (O-RU) corresponding to a wireless unit and a Distributed Unit (O-DU) corresponding to a baseband unit. One purpose of the O-RAN fronthaul specifications is to facilitate the connection between O-RUs and O-DUs of different vendors to achieve multivendor wireless access networks.

Non Patent Literature 1 discloses a procedure, an analysis method, and the like for verifying interconnectivity between an O-DU and an O-RU. Non Patent Literature 1 discloses that a Fronthaul (FH) Protocol analyzer is connected between the O-DU and the O-RU to analyze data to be sent between the O-DU and the O-RU with the FH Protocol analyzer.

CITATION LIST

Non Patent Literature

Non Patent Literature 1: ORAN-WG4.IOT.0-v01.00 O-RAN Fronthaul Working Group Fronthaul Interoperability Test Specification (IOT)

SUMMARY OF INVENTION

Technical Problem

However, the FH Protocol analyzer disclosed in Non Patent Literature 1 can only analyze data that can be acquired before a Secure Shell (SSH) connection between the O-DU and the O-RU is established. That is, the FH Protocol analyzer cannot acquire information sent through the SSH after the SSH connection between the O-DU and the O-RU is established. Thus, the FH Protocol analyzer has a problem of being unable to analyze data to be sent between the O-DU and the O-RU through the SSH connection.

A purpose of the present disclosure is to provide a communication apparatus, a data recording method, and a program that enable acquisition of data to be sent in a Secure Shell (SSH) connection after the SSH connection between a wireless unit and a baseband unit is established.

Solution to Problem

A communication apparatus according to a first aspect of the present disclosure includes a communication unit that establishes a first Secure Shell (SSH) connection with a wireless apparatus that performs wireless communication with a communication terminal, and establishes a second SSH connection with a control apparatus that performs a baseband process related to a signal used in the wireless communication, and a data recording unit that records data of a management plane received from the wireless apparatus through the first SSH connection or the data of the management plane received from the control apparatus through the second SSH connection.

A data recording method according to a second aspect of the present disclosure includes establishing a first Secure Shell (SSH) connection with a wireless apparatus that performs wireless communication with a communication terminal, establishing a second SSH connection with a control apparatus that performs a baseband process related to a signal used in the wireless communication, and recording data of a management plane received from the wireless apparatus through the first SSH connection or the data of the management plane received from the control apparatus through the second SSH connection.

A program according to a third aspect of the present disclosure causes a computer to execute establishing a first Secure Shell (SSH) connection with a wireless apparatus that performs wireless communication with a communication terminal, establishing a second SSH connection with a control apparatus that performs a baseband process related to a signal used in the wireless communication, and recording data of a management plane received from the wireless apparatus through the first SSH connection or the data of the management plane received from the control apparatus through the second SSH connection.

Advantageous Effects of Invention

With the present disclosure, it is possible to provide a communication apparatus, a data recording method, and a program that enable acquisition of data to be sent after a Secure Shell (SSH) connection between a wireless unit and a baseband unit is established.

BRIEF DESCRIPTION OF DRAWINGS

FIG. 8 is a diagram showing a Yang module according to the second example embodiment;

FIG. 12 is a diagram showing an Ethernet header according to the third example embodiment;

FIG. 13 is a diagram showing an eCPRI Transport header according to the third example embodiment;

FIG. 14 is a diagram showing a Section Type 1 message of a C-Plane according to the third example embodiment;

FIG. 15 is a diagram showing a Section Type 3 message of the C-Plane according to the third example embodiment;

FIG. 16 is a diagram showing a Section Type 1 and 3 message of a U-Plane according to the third example embodiment;

DESCRIPTION OF EMBODIMENTS

First Example Embodiment

Figure 1:
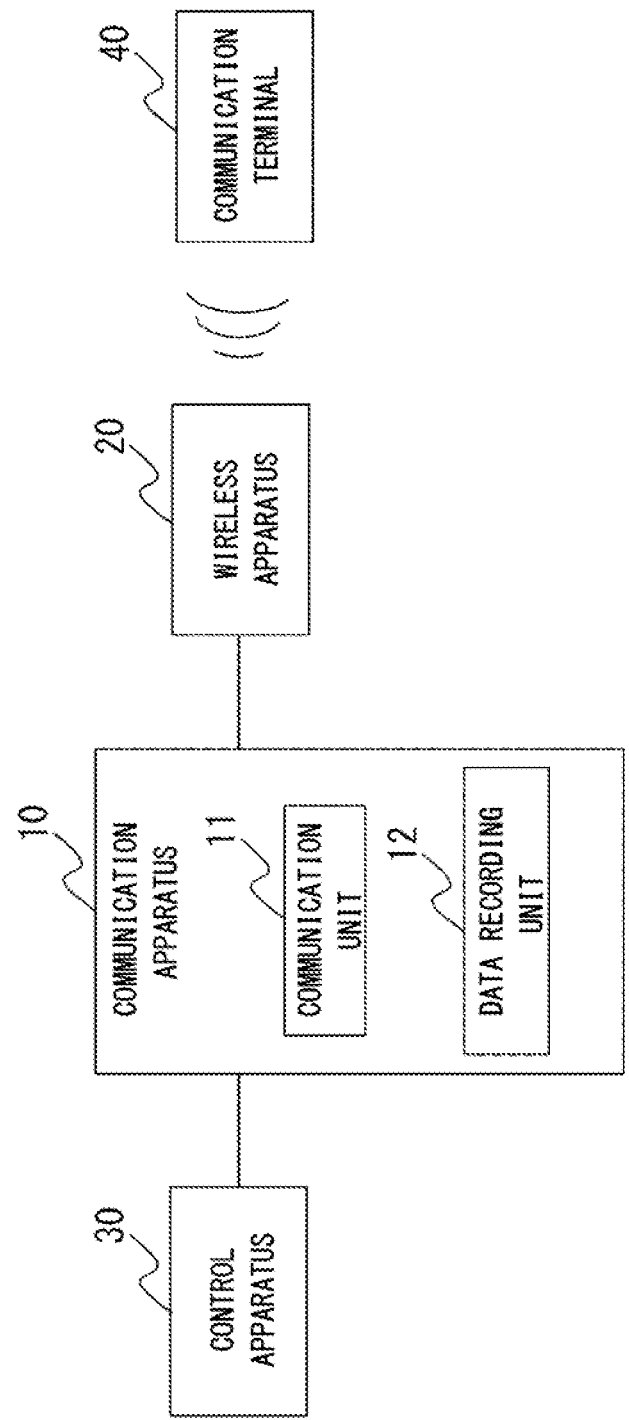
FIG. 1 is a configuration diagram of a communication apparatus according to a first example embodiment.

Hereinafter, example embodiments of the present disclosure will be described with reference to the drawings. First, a configuration example of a communication apparatus 10 according to a first example embodiment is described with reference to FIG. 1. The communication apparatus 10 may be a computer apparatus that operates by executing a program.

The communication apparatus 10 includes a communication unit 11 and a data recording unit 12. The communication unit 11 and the data recording unit 12 may be software or modules whose processes are executed by a processor executing a program stored in a memory.

The communication unit 11 establishes a first SSH connection with a wireless apparatus 20 that performs wireless communication with a communication terminal 40, and establishes a second SSH connection with a control apparatus 30 that performs a baseband process related to signals used by the wireless apparatus 20. The communication terminal 40 may be, for example, a smartphone terminal, an Internet of Things (IoT) terminal, a Machine Type Communication (MTC) device, or the like.

The wireless apparatus 20 may be, for example, an O-RU entity (hereinafter, referred to as an O-RU) specified in the O-RAN alliance. The control apparatus 30 may be, for example, an O-DU entity (hereinafter, referred to as an O-DU) specified in the O-RAN alliance. An entity may be referred to as a node or a node apparatus.

It is assumed that, of a public key A and a secret key A generated by the wireless apparatus 20, the public key A is preinstalled in the communication apparatus 10. In addition, it is assumed that the communication apparatus 10 generates a public key B and a secret key B and that the public key B is preinstalled in the control apparatus 30. The communication unit 11 authenticates the wireless apparatus 20 with the public key A to establish the first SSH connection with the wireless apparatus 20. In addition, the communication unit 11 authenticates the control apparatus 30 with the public key B to establish the second SSH connection with the control apparatus 30. The establishment of an SSH connection is not limited to a method with a public key and may be performed by other methods.

The data recording unit 12 records data of a management plane received from the wireless apparatus 20 through the first SSH connection. The data recording unit 12 further records the data of the management plane received from the control apparatus 30 through the second SSH connection.

The communication apparatus 10 terminates the first SSH connection and the second SSH connection. Thus, the data recording unit 12 can decrypt encrypted data received through the first SSH connection or the second SSH connection. That is, the data recording unit 12 holds data in a format that allows the header and payload in each layer of the data to be analyzed.

The management plane handles, for example, data or messages used by the control apparatus 30 or a Network Management System (NMS) to maintain or monitor the wireless apparatus 20. The data of the management plane is data that is sent and received in the management plane.

As described above, the communication apparatus 10 according to the first example embodiment can establish an SSH connection with each of the wireless apparatus 20 and the control apparatus 30. Thus, the data of the management plane to be generally sent between the wireless apparatus 20 and the control apparatus 30 through the SSH connection can be held in a format that allows the header and payload to be analyzed. As the result, the communication apparatus 10 can acquire data to be sent after an SSH connection between the wireless apparatus 20 and the control apparatus 30 is established and analyze the acquired data.

Second Example Embodiment

Figure 2:
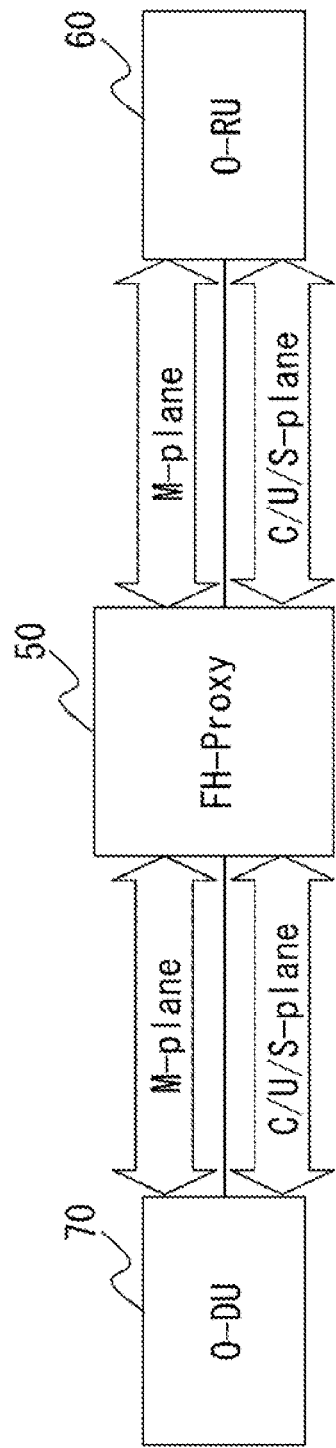
FIG. 2 is a configuration diagram of a communication system according to a second example embodiment.

Next, a configuration example of a communication system according to a second example embodiment is described with reference to FIG. 2. The communication system shown in FIG. 2 is a system configuration specified mainly in the O-RAN alliance. The communication system in FIG. 2 includes a Fronthaul (FH)-Proxy entity (hereinafter, referred to as an FH-Proxy) 50, an O-RU 60, and an O-DU 70.

The FH-Proxy 50 corresponds to the communication apparatus 10 in FIG. 1. The O-RU 60 corresponds to the wireless apparatus 20 in FIG. 1. The O-DU 70 corresponds to the control apparatus 30 in FIG. 1.

Between the FH-Proxy 50 and the O-RU 60, a Management (M)-Plane, a Control (C)-Plane, a User (U)-Plane, and a Synchronization (S)-Plane are configured. In addition, between the FH-Proxy 50 and the O-DU 70, an M-Plane, a C-Plane, a U-Plane, and an S-Plane are also configured. The FH-Proxy 50 behaves pseudo as an O-DU to the O-RU 60, and behaves pseudo as an O-RU to the O-DU 70.

Figure 3:
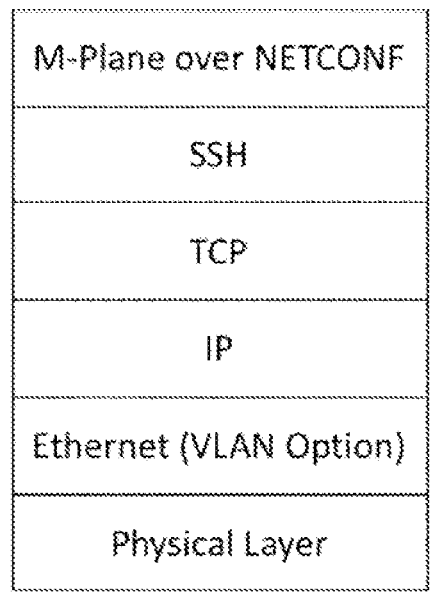
FIG. 3 is a diagram showing a protocol stack of an M-Plane according to the second example embodiment.

The M-Plane is a protocol for transferring monitoring signals used to monitor or maintain a device. Specifically, a protocol stack of the M-Plane is shown in FIG. 3. The M-Plane supports a protocol stack for transmitting signals used in a NETwork CONFigutation protocol (NETCONF) using Ethernet (registered trademark)/IP/Transmission Control Protocol (TCP)/SSH.

Figure 4:
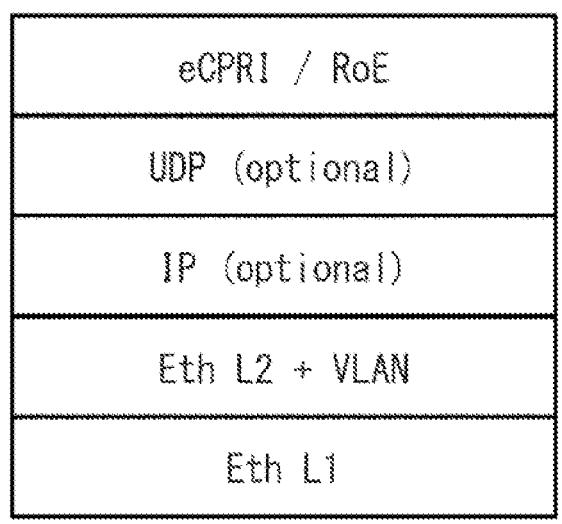
FIG. 4 is a diagram showing a protocol stack of a C/U-Plane according to the second example embodiment.

The C-Plane is a protocol for transferring control signals. The U-Plane is a protocol for transferring user data. Specifically, a protocol stack of the C-Plane and the U-Plane is shown in FIG. 4. The C-Plane and the U-Plane support a protocol stack for transmitting signals used in enhanced Common Public Radio Interface (eCPRI) or Radio over Ethernet (RoE) using Ethernet/IP/User Datagram Protocol (UDP). Alternatively, the C-Plane and the U-Plane may support a protocol stack for transmitting signals used in eCPRI or RoE directly using Ethernet.

Figure 5:
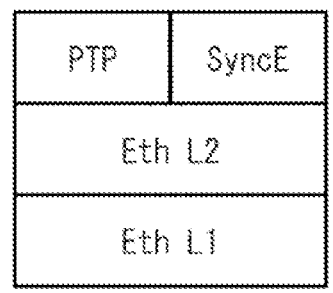
FIG. 5 is a diagram showing a protocol stack of an S-Plane according to the second example embodiment.

The S-Plane is a protocol for achieving synchronization between apparatuses. Specifically, a protocol stack of the S-Plane is shown in FIG. 5. The S-Plane supports a protocol stack for transmitting signals used in Precision Time Protocol (PTP) and SyncE using Ethernet.

Figure 6:
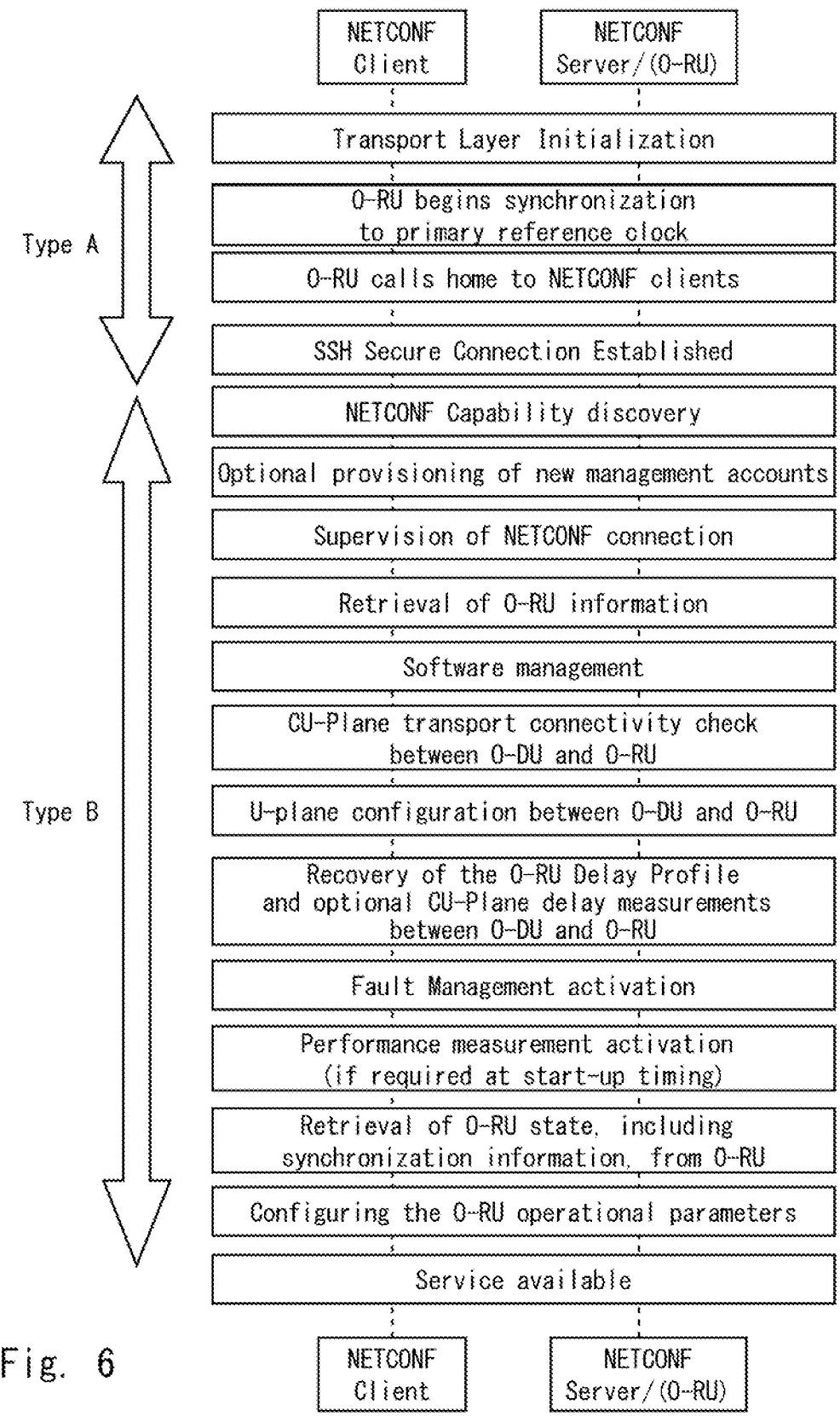
FIG. 6 is a diagram showing a Star-up sequence related to the M-Plane according to the second example embodiment.

Next, a Start-up sequence related to the M-Plane is described with reference to FIG. 6. FIG. 6 shows a procedure, for example, from the start of the O-RU 60 to be managed by the O-DU 70 until the management of the O-RU 60 by the O-DU 70 becomes possible. Management may be rephrased as monitoring. In addition, in NETCONF, the O-DU 70, which is a network apparatus that manages the O-RU 60, corresponds to a NETCONF client, and the O-RU 60 to be managed corresponds to a NETCONF server.

FIG. 6 shows that processes are performed between the NETCONF client corresponding to the O-DU 70 and the NETCONF server corresponding to the O-RU 60. Here, the communication system used in the second example embodiment has a configuration in which the FH-Proxy 50 is arranged between the O-DU 70 and the O-RU 60. Thus, FIG. 6 shows Start-up processes to be performed among the NETCONF client, the FH-Proxy 50, and the NETCONF server.

Figure 7:
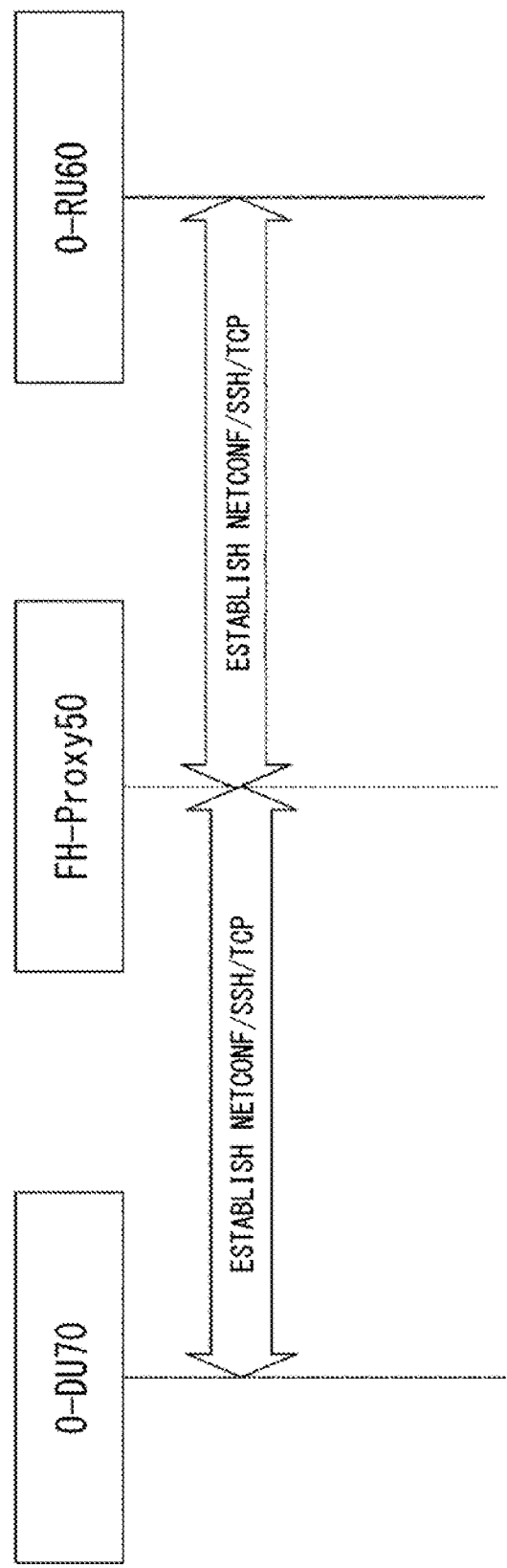
FIG. 7 is a diagram showing an SSH connection according to the second example embodiment.

First, the FH-Proxy 50, the O-RU 60, and the O-DU 70 performs processes from "Transport Layer Initialization" to "SSH Secure Connection Established" that are classified as Type A shown in FIG. 6. The processes classified as Type A are the processes between the O-RU 60 and the FH-Proxy 50 and the processes between the O-DU 70 and the FH-Proxy 50, which are performed independently. In the processes classified as Type A, the FH-Proxy 50 operates as the NETCONF client when communicating with the O-RU 60 that is the NETCONF server. In addition, the FH-Proxy 50 operates as the NETCONF server when communicating with the O-DU 70 that is the NETCONF client. As the result of performing the processes classified as Type A, SSH connections are established between the FH-Proxy 50 and the O-RU 60 and between the FH-Proxy 50 and the O-DU 70 as shown in FIG. 7.

In addition, by performing the processes classified as Type A, the FH-Proxy 50, the O-RU 60, and the O-DU 70 also perform the configuration of Transport Layer. The configuration of Transport Layer may be, for example, to configure an IP address or an Ethernet address, which is a Transport Layer address, for each apparatus. The FH-Proxy 50 sets a Transport Layer address for communicating with the O-DU 70 to be different from a Transport Layer address for communicating with the O-RU 60.

By performing the processes classified as Type A, the configuration of Transport Layer and the establishment of the SSH connection are performed independently in the link between the O-RU 60 and the FH-Proxy 50 and the link between the O-DU 70 and the FH-Proxy 50.

Next, the FH-Proxy 50, the O-RU 60, and the O-DU 70 perform processes from "NETCONF Capability discovery" to "Configuration the O-RU operational parameters" that are classified as Type B shown in FIG. 6. The processes classified as Type B are processes performed between the O-RU 60 that is the NETCONF server and the O-DU 70 that is the NETCONF client via the FH-Proxy 50.

Each process of the Start-up sequence shown in FIG. 6 is performed using a message specified in NETCONF. The set of parameters configured in the message is specified in the Yang module shown in FIG. 8. In FIG. 8, the parameters labeled "A" are the parameters used in the processes classified as Type A, and the other parameters are used in the processes classified as Type B. In addition, in FIG. 8, the parameters labeled "O-RU Capability" indicate Capability information supported by the O-RU 60. As the message specified in the NETCONF, an rpc message, an rpc-reply message, or a notification message is used, for example. The O-DU 70 and the O-RU 60 use these messages to configure parameters (edit-config), to acquire parameters (get-config), or the like.

For example, the O-RU 60 and the FH-Proxy 50 configure MAC addresses designated in a Transport flow of "o-ran-processing element" of the Yang module. This defines the addresses of both ends of the flow defined between the O-RU 60 and the FH-Proxy 50. Each address can be a Source address and a Destination Address of data to be sent between the O-RU 60 and the FH-Proxy 50. In addition, the O-DU 70 and the FH-Proxy 50 similarly configure MAC addresses designated in the Transport flow of "o-ran-processing element" of the Yang module. This defines the addresses of both ends of the flow defined between the O-RU 60 and the FH-Proxy 50. Each address can be a Source address and a Destination Address of data to be sent between the O-DU 70 and the FH-Proxy 50.

Figure 9:
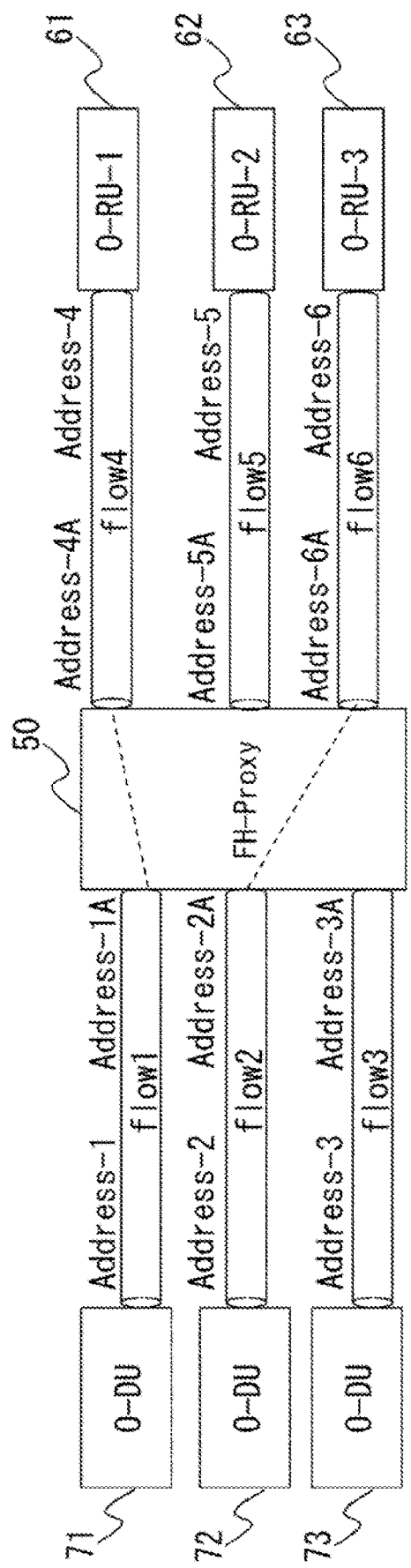
FIG. 9 is a diagram showing a flow defined between an FH-Proxy, and an O-RU and an O-DU according to the second example embodiment.

FIG. 9 shows a flow defined using address information designated in "o-ran-processing-element". FIG. 9 shows that the FH-Proxy 50 is arranged between an O-RU 61, an O-RU 62, and an O-RU 63 and an O-DU 71, an O-DU 72, and an O-DU 73. Each of the number of O-DUs and the number of O-RUs connected to the FH-Proxy 50 is not one, but multiple as shown in FIG. 9, and the numbers of O-DUs and O-RUs may not be the same.

The FH-Proxy 50 defines an Address-1 of the O-DU 71 and an address-1A of the FH-Proxy 50 as a flow1 and communicates with the O-DU 71. The flow may be referred to as a Transport flow. Similarly, the FH-Proxy 50 defines an Address-2 of the O-DU 72 and an address-2A of the FH-Proxy 50 as a flow2 and communicates with the O-DU 72. The FH-Proxy 50 defines an Address-3 of the O-DU 73 and an address-3A of the FH-Proxy 50 as a flow3 and communicates with the O-DU 73. The FH-Proxy 50 defines an Address-4 of the O-RU 61 and an address-4A of the FH-Proxy 50 as a flow4 and communicates with the O-RU 61. The FH-Proxy 50 defines an Address-5 of the O-RU 62 and an address-5A of the FH-Proxy 50 as a flow5 and communicates with the O-RU 62. The FH-Proxy 50 defines an Address-6 of the O-RU 63 and an address-6A of the FH-Proxy 50 as a flow6 and communicates with the O-RU 63.

Since the number of O-DUs and the number of O-RUs connected to the FH-Proxy 50 are each multiple, the interconnectivity between any O-DU and any O-RU connected to the FH-Proxy 50 can be verified by configuring the FH-Proxy 50 without physically plugging and unplugging the O-DUs and the O-RUs.

When, for example, verifying the interconnectivity between the O-DU 71 and the O-RU 61, the FH-Proxy 50 uses the Address-1A and the Address-4A for the verification. In other words, when verifying the interconnectivity between the O-DU 71 and the O-RU 61, the FH-Proxy 50 uses the flow1 and the flow4 for the verification. Similarly, when verifying the interconnectivity between the O-DU 72 and the O-RU 63, the FH-Proxy 50 uses the Address-2A and the Address-6A for the verification.

When performing a Type B process, the FH-Proxy 50 terminates and converts the Transport Layer address as shown in FIG. 9, but allows the NETCONF layer, which is an upper layer, to be transparent. The FH-Proxy 50 records information transmitted in the NETCONF layer. In other words, the FH-Proxy 50 records information transmitted in the NETCONF layer as a log and visualizes the information transmitted in the NETCONF layer. In addition, when performing a Type A process, the FH-Proxy 50 records information transmitted in the NETCONF layer as a log and visualizes the information transmitted in the NETCONF layer.

Here, as an example of a process classified as Type B, a process related to "Retrieval of O-RU Information" is described with reference to FIG. 10. The process related to "Retrieval of O-RU Information" is a process to be performed by the O-DU 70 to acquire a parameter related to the O-RU 60. First, the O-DU 70 sends, to the FH-Proxy 50, a rpc message in which "get-config" for acquiring a parameter and "ru-id" indicating the parameter to be acquired are set (S11).

Next, the FH-Proxy 50 changes the Transport Layer address of the received rpc message (S12). Specifically, the FH-Proxy 50 changes the destination MAC address of the rpc message to the MAC address of the O-RU 60 and changes the source MAC address to the MAC address of the FH-Proxy 50. When changing the Transport Layer address, the FH-Proxy 50 changes "ietf-interface", "o-ran-interface", "o-ran-processing-element" used in the processes classified as Type A. Next, the FH-Proxy 50 transfers, to the O-RU 60, the rpc message whose Transport Layer address has been changed (S13). At this time, the FH-Proxy 50 allows the information in the NETCONF layer of the rpc message to be transparent.

Next, the FH-Proxy 50 records the rpc message (S14). For example, the FH-Proxy 50 may record the header and payload of the rpc message.

Next, the O-RU 60 sends, to the FH-Proxy 50, a rpc-reply message in which, for example, "ru-id_A" is set as "ru-id" of the O-RU 60 (S15).

Next, the FH-Proxy 50 changes the Transport Layer address of the received rpc-reply message (S16). Specifically, the FH-Proxy 50 changes the destination MAC address of the rpc-reply message to the MAC address of the O-DU 70 and changes the source MAC address to the MAC address of the FH-Proxy 50. The parameters of the Yang module used to change the Transport Layer address are similar to those in step S12. Next, the FH-Proxy 50 transfers, to the O-DU 70, the rpc-reply message whose Transport Layer address has been changed (S17).

Next, the FH-Proxy 50 records the rpc-reply message (S18). For example, the FH-Proxy 50 may record the header and payload of the rpc-reply message. The FH-Proxy 50 records the header and payload of the rpc-reply message, and thereby can record "ru-id_A" that is the information about the O-RU 60 configured in the rpc-reply message as information designated in the M-Plane.

Figure 10:
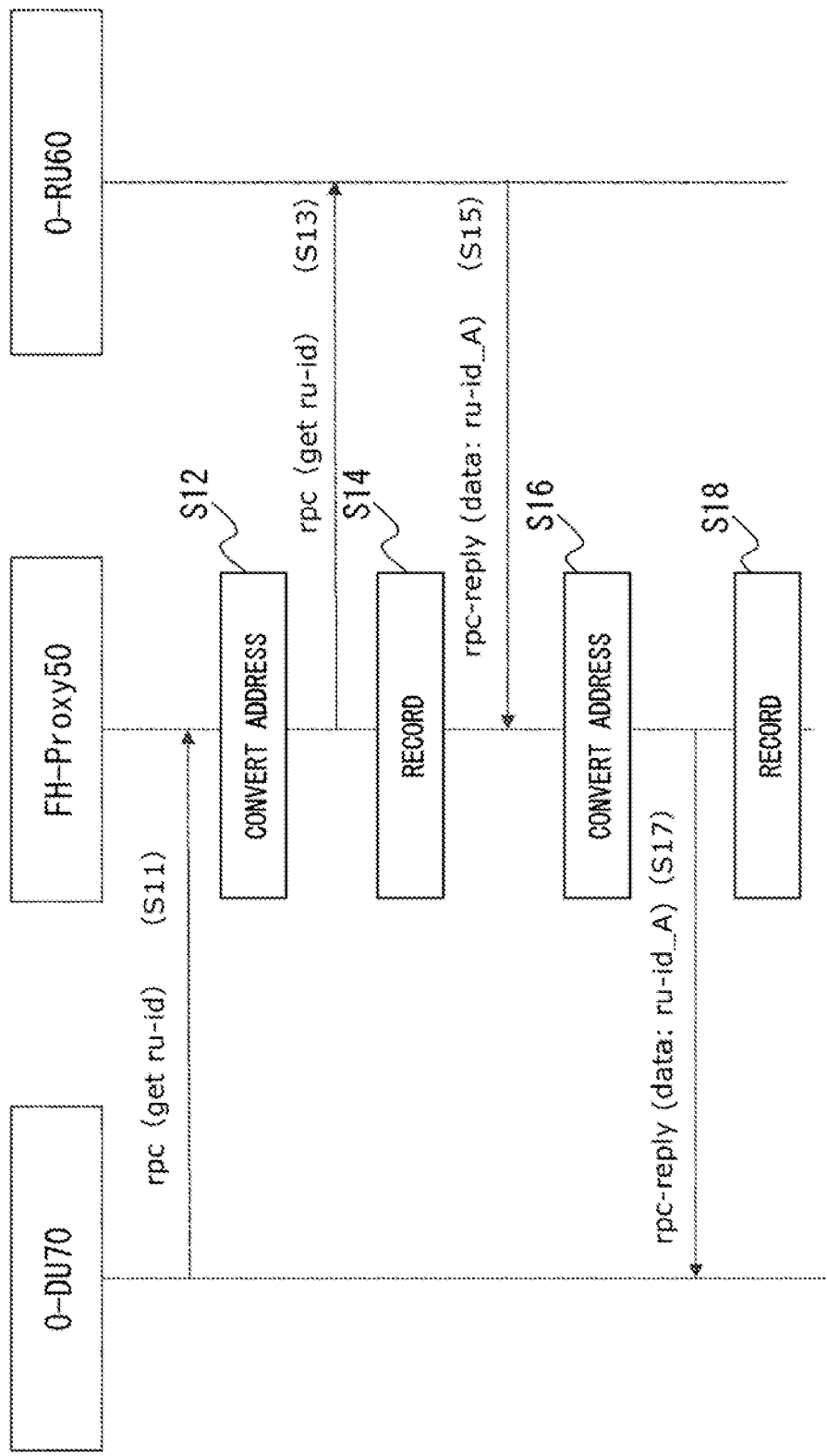
FIG. 10 is a diagram showing a process flow classified as Type B according to the second example embodiment.

In FIG. 10, "Retrieval of O-RU Information" is described, but the O-DU 70 may configure, in the rpc message, "edit-config" for configuring a parameter to configure the parameter to the O-RU 60 in other processes.

In FIG. 10, the flow of data to be sent in the M-Plane is described, but the similar flow applies to data in the C-Plane, the U-Plane, and the S-Plane. That is, the FH-Proxy 50 convers the Transport Layer address of data in the C-Plane, the U-Plane, and the S-Plane and records information to be sent in each layer.

As described above, the FH-Proxy 50 establishes an SSH connection with each of the O-RU 60 and the O-DU 70 and configures each M-Plane, and thereby can record a message to be transferred in NETCONF. In other words, the FH-Proxy 50 can record the content set in the header and payload of a message to be transferred in NETCONF. In addition, the FH-Proxy 50 can record messages of the C-Plane, the U-Plane, and the S-Plane that are not sent through the SSH connection.

In this manner, the FH-Proxy 50 can record messages related to the M-Plane, the C-Plane, the U-Plane, and the S-Plane. Accordingly, the administrator or the like who manages the FH-Proxy 50 can use the recorded messages for an analysis process.

Third Example Embodiment

Figure 11:
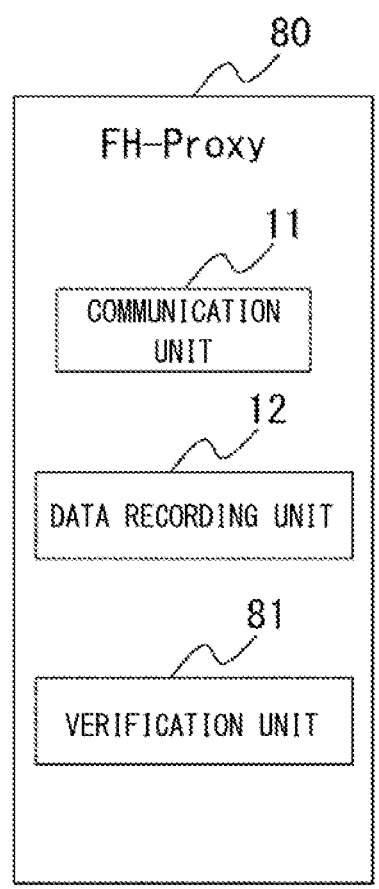
FIG. 11 is a configuration diagram of an FH-Proxy according to a third example embodiment.

Next, a configuration example of an FH-Proxy 80 according to a third example embodiment is described with reference to FIG. 11. The FH-Proxy 80 has a configuration in which a verification unit 81 is added to the communication apparatus 10 in FIG. 1. The FH-Proxy 80 has a configuration in which the verification unit 81 that performs a message analysis process is added to the FH-Proxy 50 that records messages related to the M-Plane, the C-Plane, the U-Plane, and the S-Plane. In the following, functions or processes of the FH-Proxy 80 that are different from those of the FH-Proxy 50 corresponding to the communication apparatus 10 are mainly described.

A data recording unit 12 records, as data related to the M-Plane, Capability information about an O-RU 60, parameter values configured by an O-DU 70 to the O-RU 60, and the like, for example. In addition, the data recording unit 12 records the header and payload in each layer of a message related to each of the C-Plane, the U-Plane, and the S-Plane. The data recording unit 12 may convert the Transport Layer address of the message related to each of the C-Plane, the U-Plane, and the S-Plane and record the header and payload of each message when transferring it, similarly to the sequence in FIG. 10.

The verification unit 81 uses various types of data recorded by the data recording unit 12 to verify the interconnectivity between the O-RU 60 and the O-DU 70. The verification unit 81 may autonomously perform verification in accordance with a predetermined verification item. For example, the verification item may be to compare information designated in the M-Plane with parameters of the C-Plane, the U-Plane, or the S-Plane configured based on the information. Alternatively, the verification item may be to display information sent and received in the M-plane in chronological order and check whether the information is processed in the order of FIG. 6. The details of the interconnectivity verification are described below.

The data recording unit 12 records the Ethernet header of the message related to each of the C-Plane and the U-Plane. FIG. 12 shows the Ethernet header. Destination MAC Address and Source MAC Address contained in the Ethernet header are "o-du-mac-address" and "o-ru-mac-address" designated in the Transport flow of "o-ran-processing-element" of the M-Plane. In addition, "VLAN ID" contained in "VLAN Tag" contained in the Ethernet header is "vlan-id" designated in the Transport flow of "o-ran-processing-element" of the M-Plane. In addition, "CoS priority" contained in "VLAN Tag" is "u-plane-marking" and "c-plane-marking" designated in the M-Plane.

The verification unit 81 determines whether the information designated in the M-Plane matches the information set in the Ethernet header. When determining that they do not match, the verification unit 81 may output, to a display unit such as a display connected to the FH-Proxy 80, an analysis result indicating that the information set in the Ethernet header and the information designated in the M-Plane are different values.

Next, the eCPRI Transport header is described with reference to FIG. 13. The data recording unit 12 records the eCPRI Transport header contained in the Ethernet payload of the message related to the C-Plane.

Note that, "ecpriVersion" contained in the eCPRI Transport header is "ecpriVersion" contained in Capability information designated by the O-RU 60 in the M-Plane. In addition, "ecpriRtcid/ecpriPcid" is "eaxc-id" designated in the M-Plane.

The verification unit 81 determines whether the information designated in the M-Plane matches the information set in the eCPRI Transport header. When determining that they do not match, the verification unit 81 may output, to a display unit such as a display connected to the FH-Proxy 80, an analysis result indicating that the information set in the eCPRI Transport header and the information designated in the M-Plane are different values.

Then, a message specified as Section Type 1 in the Application layer of the C-Plane is described with reference to FIG. 14. The data recording unit 12 records a Section Type 1 message in the Application layer of the C-Plane.

The Section Type 1 message is a message to be sent from the O-DU 70 to the O-RU 60 when the Capability information designated by the O-RU 60 in the M-Plane indicates that the message is supported by the O-RU 60. Note that, "symInc" contained in the Section Type 1 message is set to 1 when the Capability information designated by the O-RU 60 in the M-Plane indicates the parameter is supported by the O-RU 60. In addition, "beamID" is "Beam id" contained in the Capability information designated by the O-RU 60 in the M-Plane. In addition, "udCompHdr" is set based on Compression method contained in the Capability information designated by the O-RU 60 in the M-Plane.

The verification unit 81 determines whether the information designated in the M-Plane matches the information set in the Section Type 1 message. Alternatively, the verification unit 81 may determine whether information to be set based on the information designated in the M-Plane matches the information set in the Section Type 1 message. When determining that they do not match, the verification unit 81 may output, to a display unit such as a display connected to the FH-Proxy 80, an analysis result indicating that the information set in the Section Type 1 message and the information designated in the M-Plane are different values.

Next, a message specified as Section Type 3 in the Application layer of the C-Plane is described with reference to FIG. 15. The data recording unit 12 records a Section Type 3 message in the Application layer of the C-Plane.

The Section Type 3 message is a message to be sent from the O-DU 70 to the O-RU 60 when the Capability information designated by the O-RU 60 in the M-Plane indicates that the message is supported by the O-RU 60. "Frame structure" contained in the Section Type 3 message is the value indicated in the Capability information designated by the O-RU 60 in the M-Plane. Note that, "symInc" is set to 1 when the Capability information designated by the O-RU 60 in the M-Plane indicates that the parameter is supported by the O-RU 60. In addition, "beamID" is "Beam id" contained in the Capability information designated by the O-RU 60 in the M-Plane. In addition, "udCompHdr" is set based on Compression method contained in the Capability information designated by the O-RU 60 in the M-Plane.

The verification unit 81 determines whether the information designated in the M-Plane matches the information set in the Section Type 3 message. Alternatively, the verification unit 81 may determine whether information to be set based on the information designated in the M-Plane matches the information set in the Section Type 3 message. When determining that they do not match, the verification unit 81 may output, to a display unit such as a display connected to the FH-Proxy 80, an analysis result indicating that the information set in the Section Type 3 message and the information designated in the M-Plane are different values.

Next, a message specified as Section Type 1 and 3 in the Application layer of the U-Plane is described with reference to FIG. 16. The data recording unit 12 records a Section Type 1 and 3 message in the Application layer of the U-Plane.

The Section Type 3 message is a message to be sent from the O-DU 70 to the O-RU 60 when the Capability information designated by the O-RU 60 in the M-Plane indicates that the message is supported by the O-RU 60. Note that, "symInc" contained in the Section Type 1 and 3 message is set to 1 when the Capability information designated by the O-RU 60 in the M-Plane indicates that the parameter is supported by the O-RU 60. In addition, "udCompHdr" is set based on Compression method contained in the Capability information designated by the O-RU 60 in the M-Plane.

The verification unit 81 determines whether the information designated in the M-Plane matches the information set in the Section Type 1 and 3 message. Alternatively, the verification unit 81 may determine whether information to be set based on the information designated in the M-Plane matches the information set in the Section Type 1 and 3 message. When determining that they do not match, the verification unit 81 may output, to a display unit such as a display connected to the FH-Proxy 80, an analysis result indicating that the information set in the Section Type 1 and 3 message and the information designated in the M-Plane are different values.

As described above, the FH-Proxy 80 analyzes the message recorded by the data recording unit 12 to determine whether the information designated in the M-Plane matches the information set in the C-Plane and the U-Plane. Accordingly, the FH-Proxy 80 can determine whether the information designated in the M-Plane is correctly set to data to be sent from the O-RU 60 or the O-DU 70. In addition, when it is determined that the information designated in the M-Plane is not correctly set, the administrator or the like of the FH-Proxy 80 can analyze the configuration of the O-RU 60 or the O-DU 70 that is the source of the message to determine which apparatus has a problem. Alternatively, the FH-Proxy 80 may autonomously analyze which apparatus has a problem in accordance with a predetermined scenario. In addition, messages that can be analyzed by the verification unit 81 are not limited to the above messages.

Modified Example in Second and Third Example Embodiments

Figure 17:
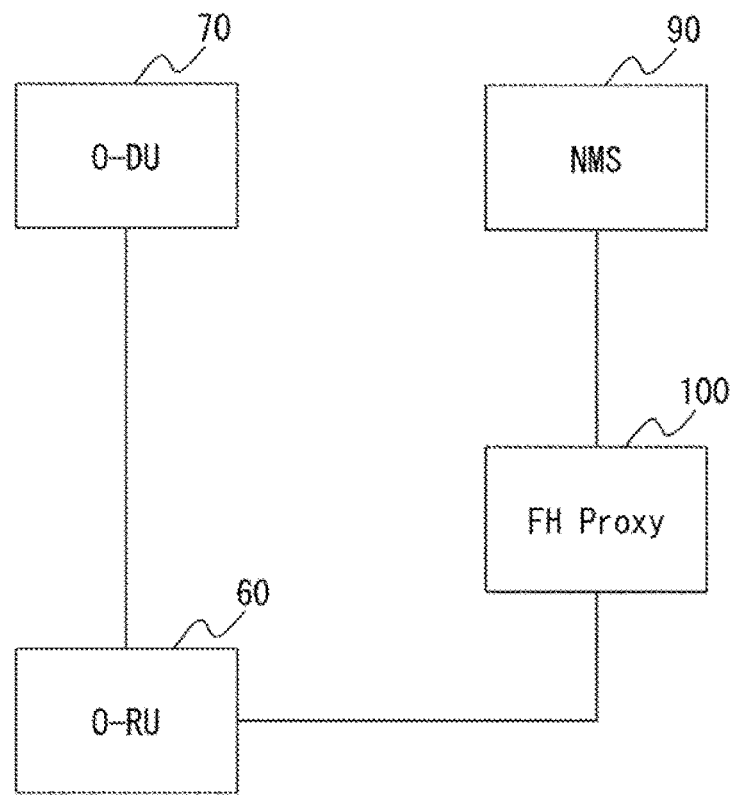
FIG. 17 is a diagram showing a modified example of the communication system according to the second and third example embodiments.

In the second example embodiment, it has been described that the FH-Proxy 50 or the FH-Proxy 80 is arranged between the O-RU 60 and the O-DU 70, and the FH-Proxy 50 or FH-Proxy 80 acquires a message to be transmitted between the O-RU 60 and the O-DU 70. In contrast, an FH-Proxy 100 may be arranged between the O-RU 60 and an NMS 90 as shown in FIG. 17, and the FH-Proxy 100 may acquire a message to be transmitted between the O-RU 60 and the NMS 90. The O-DU 70 in FIG. 17 controls a part of parameters or functions of the O-RU 60, and the NMS 90 controls the rest of the parameters or functions. Any of nodes such as a network switch, a bridge, a router, and a Fronthaul Multiplexer connected between the O-RU 60 and the O-DU 70 or the NMS 90 may be equipped with all or a part of the communication unit, the data recording unit, and the verification unit of the FH-Proxy 80.

Figure 18:
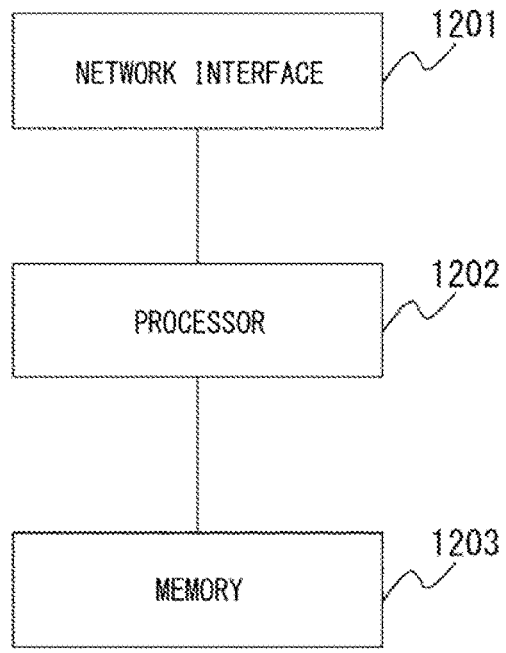
FIG. 18 is a configuration diagram of a communication apparatus and an FH-Proxy according to each example embodiment.

FIG. 18 is a block diagram showing a configuration example of the communication apparatus 10, the FH-Proxy 50, the FH-Proxy 80, and the FH-Proxy 100 (hereinafter, referred to as the communication apparatus 10 or the like). In FIG. 18, the communication apparatus 10 or the like includes a network interface 1201, a processor 1202, and a memory 1203. The network interface 1201 is used to communicate with a network node (e.g., eNB, MME, P-GW). The network interface 1201 may include, for example, a network interface card (NIC) in compliance with the IEEE 802.3 series. Here, eNB represents evolved Node B, MME represents Mobility Management Entity, and P-GW represents Packet Data Network Gateway. IEEE represents Institute of Electrical and Electronics Engineers.

The processor 1202 loads software (a computer program) from the memory 1203 and executes it to perform the processes of the communication apparatus 10 or the like that are described with reference to the flowchart in the above example embodiments. The processor 1202 may be, for example, microprocessor, an MPU or a CPU. The processor 1202 may include a plurality of processors.

The memory 1203 is configured by a combination of a volatile memory and a non-volatile memory. The memory 1203 may include a storage arranged away from the processor 1202. In this case, the processor 1202 may access the memory 1203 via an Input/Output (I/O) interface that is not illustrated.

In the example in FIG. 18, the memory 1203 is used to store a group of software modules. The processor 1202 loads the group of software modules from the memory 1203 and executes them to perform the processes of the communication apparatus 10 or the like described in the above example embodiments.

As described with reference to FIG. 18, each processor included in the communication apparatus 10 or the like in the above example embodiments executes one or more programs containing a set of instructions for causing a computer to execute the algorithms described with reference to the drawings.

In the above examples, the one or more programs can be stored by various types of non-transitory computer-readable media and provided to a computer. Non-transitory computer-readable media include any type of tangible storage media. Examples of non-transitory computer-readable media include magnetic storage media (such as flexible disks, magnetic tapes, and hard disk drives), optical magnetic storage media (such as magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, and Random Access Memory (RAM)). The one or more programs may be provided to a computer using any type of transitory computer-readable media. Examples of transitory computer-readable media include electric signals, optical signals, and electromagnetic waves. Transitory computer readable media can provide the one or more programs to a computer through a wired communication line (such as electric wires, and optical fibers) or a wireless communication line.

The present invention has been described above with reference to the example embodiments but is not limited to the above. Various modifications that can be understood by those skilled in the art can be made to the configurations and the details of the present invention within the scope of the invention.

Note that, the present disclosure is not limited to the above example embodiments and can be modified without departing from the gist thereof.

This application is based upon and claims the benefit of priority of Japanese Patent Application No. 2020-042467 filed on Mar. 11, 2020, the disclosure of which is incorporated herein in its entirety by reference.

A part or all of the above example embodiments may be described as the following Supplementary notes but are not limited to the following.

(Supplementary Note 1)

A communication apparatus comprising:
    a communication means for establishing a first Secure Shell (SSH) connection with a wireless apparatus configured to perform wireless communication with a communication terminal and for establishing a second SSH connection with a control apparatus configured to perform a baseband process related to a signal used in the wireless communication; and
    a data recording means for recording data of a management plane received from the wireless apparatus through the first SSH connection or the data of the management plane received from the control apparatus through the second SSH connection.

(Supplementary Note 2)

The communication apparatus according to Supplementary note 1, wherein the communication means changes a destination address of first data of the management plane received from the wireless apparatus to a first address indicating the control apparatus to send the first data to the control apparatus, and changes a destination address of second data of the management plane received from the control apparatus to a second address indicating the wireless apparatus to send the second data to the wireless apparatus.

(Supplementary Note 3)

The communication apparatus according to Supplementary note 2, wherein the communication means changes a source address of the first data to be sent to the control apparatus to a third address indicating the communication apparatus, and changes a source address of the second data to be sent to the wireless apparatus to a fourth address indicating the communication apparatus.

(Supplementary Note 4)

The communication apparatus according to Supplementary note 2 or 3, wherein an address to be set for each of the first data and the second data is a Media Access Control (MAC) address.

(Supplementary Note 5)

The communication apparatus according to any one of Supplementary notes 1 to 4, wherein
    the communication means acquires data of at least one of a control plane, a user plane, or a synchronization plane to be sent between the wireless apparatus and the control apparatus, and
    a destination address to be set for the acquired data is specified using the data of the management plane.

(Supplementary Note 6)

The communication apparatus according to any one of Supplementary notes 1 to 5, wherein the data recording means records the data of at least one of the control plane, the user plane, or the synchronization plane received from the wireless apparatus or the control apparatus, and
    the communication apparatus further includes a verification means for determining, using the data of the management plane, whether correct information is set for the data of at least one of the control plane, the user plane, or the synchronization plane.

(Supplementary Note 7)

A data recording method comprising:
establishing a first Secure Shell (SSH) connection with a wireless apparatus configured to perform wireless communication with a communication terminal;
establishing a second SSH connection with a control apparatus configured to perform a baseband process related to a signal used in the wireless communication; and
recording data of a management plane received from the wireless apparatus through the first SSH connection or the data of the management plane received from the control apparatus through the second SSH connection.

(Supplementary Note 8)

A non-transitory computer-readable medium storing a program causing a computer to execute:
establishing a first Secure Shell (SSH) connection with a wireless apparatus configured to perform wireless communication with a communication terminal;
establishing a second SSH connection with a control apparatus configured to perform a baseband process related to a signal used in the wireless communication; and
recording data of a management plane received from the wireless apparatus through the first SSH connection or the data of the management plane received from the control apparatus through the second SSH connection.

REFERENCE SIGNS LIST

10 Communication apparatus
11 Communication unit
12 Data recording unit
20 Wireless apparatus
30 Control apparatus
40 Communication terminal
50 FH-Proxy
60 O-RU
61 O-RU
62 O-RU
63 O-RU
70 O-DU
71 O-DU
72 O-DU
73 O-DU
80 FH-Proxy
81 Verification unit
90 NMS
100 FH-Proxy

What is claimed is:

1. A communication apparatus comprising:
at least one memory storing instructions, and
at least one processor configured to execute the instructions to:
establish a first Secure Shell (SSH) connection with a wireless apparatus configured to perform wireless communication with a communication terminal and establish a second SSH connection with a control apparatus configured to perform a baseband process related to a signal used in the wireless communication;
record data of a management plane received from the wireless apparatus through the first SSH connection or the data of the management plane received from the control apparatus through the second SSH connection; and
change a destination address of first data of the management plane received from the wireless apparatus to a first address indicating the control apparatus to send the first data to the control apparatus, and change a destination address of second data of the management plane received from the control apparatus to a second address indicating the wireless apparatus to send the second data to the wireless apparatus.

2. The communication apparatus according to claim 1, wherein the at least one processor is further configured to execute the instructions to change a source address of the first data to be sent to the control apparatus to a third address indicating the communication apparatus, and change a source address of the second data to be sent to the wireless apparatus to a fourth address indicating the communication apparatus.

3. The communication apparatus according to claim 1, wherein an address to be set for each of the first data and the second data is a Media Access Control (MAC) address.

4. The communication apparatus according to claim 1, wherein
the at least one processor is further configured to execute the instructions to acquire data of at least one of a control plane, a user plane, or a synchronization plane to be sent between the wireless apparatus and the control apparatus, and
a destination address to be set for the acquired data of the at least one of the control plane, the user plane, or the synchronization plane is specified using the data of the management plane.

5. The communication apparatus according to claim 1, wherein the at least one processor is further configured to execute the instructions to record the data of at least one of a control plane, a user plane, or a synchronization plane received from the wireless apparatus or the control apparatus, and determine, using the data of the management plane, whether correct information is set for the data of at least one of the control plane, the user plane, or the synchronization plane.

6. A data recording method comprising:
establishing a first Secure Shell (SSH) connection with a wireless apparatus configured to perform wireless communication with a communication terminal;
establishing a second SSH connection with a control apparatus configured to perform a baseband process related to a signal used in the wireless communication;
recording data of a management plane received from the wireless apparatus through the first SSH connection or the data of the management plane received from the control apparatus through the second SSH connection; and
changing a destination address of first data of the management plane received from the wireless apparatus to a first address indicating the control apparatus to send the first data to the control apparatus, and changing a destination address of second data of the management plane received from the control apparatus to a second address indicating the wireless apparatus to send the second data to the wireless apparatus.

7. A non-transitory computer-readable medium storing a program causing a computer to execute:
establishing a first Secure Shell (SSH) connection with a wireless apparatus configured to perform wireless communication with a communication terminal;
establishing a second SSH connection with a control apparatus configured to perform a baseband process related to a signal used in the wireless communication;
recording data of a management plane received from the wireless apparatus through the first SSH connection or the data of the management plane received from the control apparatus through the second SSH connection; and changing a destination address of first data of the management plane received from the wireless apparatus to a first address indicating the control apparatus to send the first data to the control apparatus, and changing a destination address of second data of the management plane received from the control apparatus to a second address indicating the wireless apparatus to send the second data to the wireless apparatus.

\* \* \* \* \*